United States Patent [19]

Orlen et al.

[11] Patent Number: 5,579,535
[45] Date of Patent: Nov. 26, 1996

[54] PERSONAL COMMUNICATION SYSTEM PROVIDING SUPPLEMENTAL INFORMATION MODE

[75] Inventors: Noah P. Orlen; Robert L. Breeden; Richard E. Bessom, all of Boca Raton, Fla.

[73] Assignee: Motorola, Inc., Schaumburg, Ill.

[21] Appl. No.: 369,553

[22] Filed: Jan. 6, 1995

Related U.S. Application Data

[63] Continuation of Ser. No. 8,117, Jan. 25, 1993, abandoned, which is a continuation-in-part of Ser. No. 724,279, Jul. 1, 1991, abandoned.

[51] Int. Cl.⁶ ............................. H04Q 7/22; H04Q 7/26
[52] U.S. Cl. ................... 455/33.1; 455/56.1; 455/89; 340/905; 340/995
[58] Field of Search ......................... 455/33.1, 53.1, 455/54.1, 54.2, 56.1, 89; 340/905, 995; 345/145, 146, 147

[56] References Cited

U.S. PATENT DOCUMENTS

| | | | |
|---|---|---|---|
| 4,974,170 | 11/1990 | Bouve et al. | 364/518 |
| 5,068,838 | 11/1991 | Klausner et al. | 455/51.1 |
| 5,133,081 | 7/1992 | Mayo | 455/66 |
| 5,173,691 | 12/1992 | Sumner | 340/905 |
| 5,402,117 | 3/1995 | Zijderhand | 340/905 |

FOREIGN PATENT DOCUMENTS

| | | | |
|---|---|---|---|
| 0349430 | 1/1990 | European Pat. Off. | 340/905 |
| 2216319 | 10/1989 | United Kingdom | 379/61 |

OTHER PUBLICATIONS

Motorola Catalog Sheet R3-23-01, Silverlink 2000 Personal Telephone, CT2/CAI Compatible, published 1990.
Motorola Catalog Sheet R3-23-03, Silverlink Telepoint Base Station, CT2/CAI Compatible, published 1990.
Motorola Catalog Sheet R3-23-04, Silverlink MNCC and BMBS, published 1990.

Primary Examiner—Edward F. Urban
Attorney, Agent, or Firm—Kelly A. Gardner

[57] ABSTRACT

A personal communication system (10) comprises transceiver stations (12, 14, 16, 18) providing communication capability between one or more portable radiotelephones (20, 22, 24) and a telephone network (30). One or more of the transceiver stations (12, 14, 16, 18) is further capable of storing a data base and of transmitting the same in response to a request for such transmission being received from a portable radiotelephone (20, 22, or 24) communicating therewith. The portable radiotelephone (20, 22, or 24) communicating therewith is capable thereafter of receiving the data base and of presenting at least a portion of the same to the radiotelephone subscriber.

16 Claims, 11 Drawing Sheets

PERSONAL COMMUNICATION SYSTEM PROVIDING SUPPLEMENTAL INFORMATION MODE

RELATED APPLICATIONS

This is a continuation of application Ser. No. 08/008,117 filed on Jan. 25, 1993, now abandoned, which is a CIP of application Ser. No. 07/724,279, now abandoned.

FIELD OF THE INVENTION

The present invention relates generally to the field of personal communication systems, and more particularly to wireless data communication systems.

BACKGROUND OF THE INVENTION

Personal communication systems have greatly enhanced and expanded telecommunications in the United States and throughout the world. Examples of such personal communications systems include both cellular communication systems and cordless radiotelephone systems such as the CT-2 (second generation cordless telephone) and DECT (digital European cordless telephone) systems. These systems have provided wireless communication access to the Public Switched Telephone Network (PSTN) with the use of a plurality of fixed location telepoint base stations which have provided voice communication capability between a plurality of portable radiotelephone handsets and conventional telephone receivers.

In conventional cellular communication systems, a number of cells, i.e., base stations and their associated coverage areas, are widely distributed throughout different geographic areas. In CT-2 systems, as compared to cellular communication systems, a greater number of telepoint base stations have had to be distributed throughout different geographic areas because of the relatively low power outputs provided in the portable radiotelephone handsets. Both systems, however, generally include landmarks such as shopping malls, airports, restaurants, etc., within the coverage areas of the base stations. There is a need, therefore, to be able to provide not only conventional telecommunication capability to the system subscribers, but also data communication capability in which information of interest could be relayed to system subscribers.

SUMMARY OF THE INVENTION

According to a first aspect of the present invention, a personal communication system comprises transceiver stations providing communication capability between one or more portable units and a wireline network, wherein one or more of the transceiver stations is further capable of storing a data base and of transmitting the same in response to a request for such transmission being received from a portable units communicating therewith. The data base includes at least positional information pertaining to relative locations of the transceiver stations, and the portable unit communicating therewith is capable of receiving the data base and of presenting at least a portion of the same.

According to a second aspect of the present invention, in a personal communication system which includes transceiver stations to provide communication between a portable unit and a wireline network, wherein the transceiver stations further are capable of storing and transmitting a data base, the portable unit comprises means for generating and transmitting a request to receive the data base stored within a transceiver station through which communication is established. The data base includes at least positional information pertaining to relative locations of the transceiver stations. The portable unit further comprises a receiver for receiving the data base transmitted by the transceiver station and a presentation device for presenting at least a portion of the data base.

DESCRIPTION OF THE PREFERRED EMBODIMENTS

Figure 1:
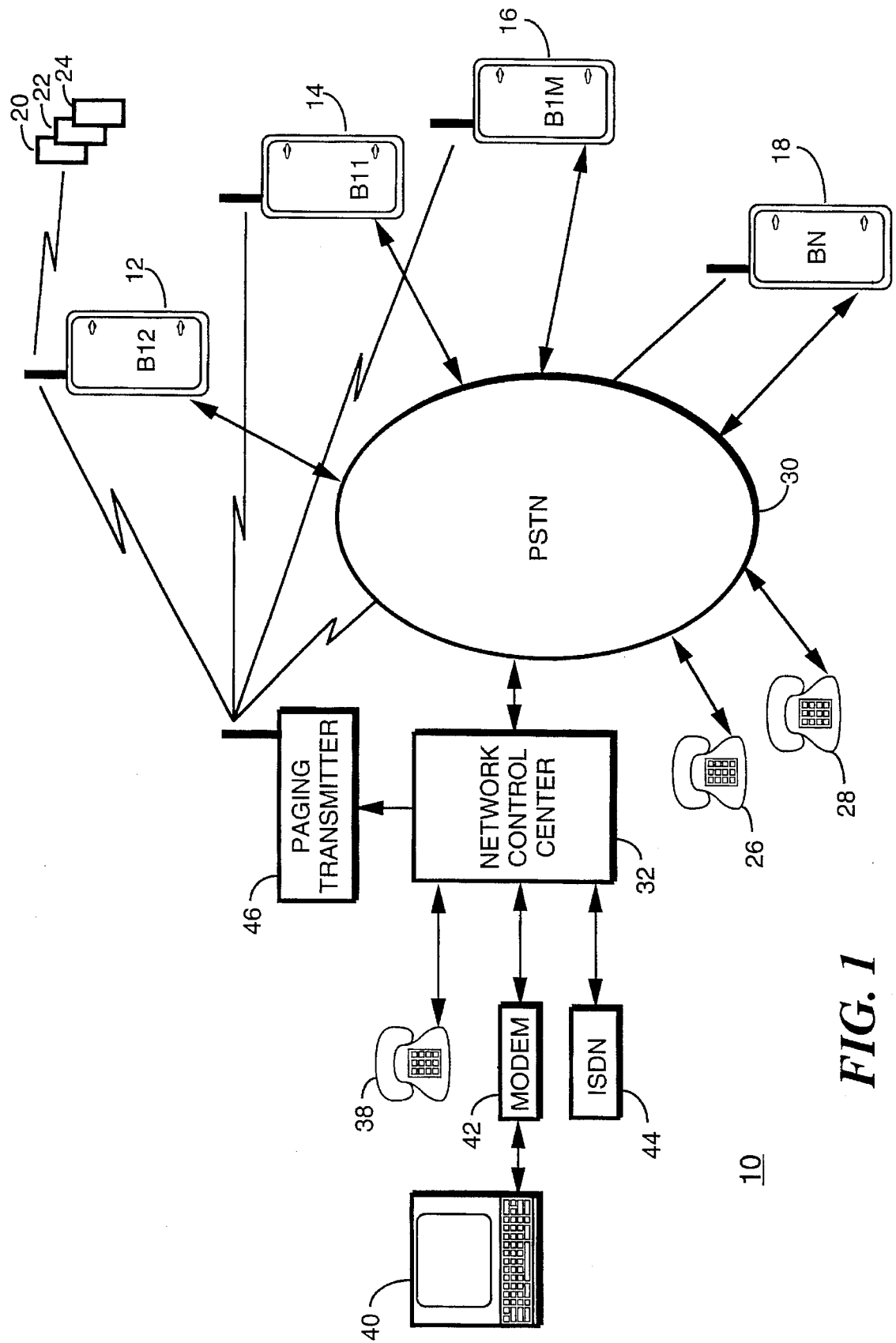
FIG. 1 is an electrical block diagram of a personal communication system in accordance with the preferred embodiment of the present invention.

Referring to the figures, FIG. 1 is an electrical block diagram of a personal communication system in accordance with the preferred embodiment of the present invention. As shown in FIG. 1, a personal communication system 10 includes a plurality of transceiver stations 12, 14, 16 and 18 (of which four are shown) which are used to provide data and/or voice communication between one or more portable units, such as radiotelephones 20, 22 and 24 (of which three are shown) and conventional telephone handsets 26, 28 through a wireless data network, e.g., the Public Switched Telephone Network (PSTN) 30. Examples of such a personal communication system 10 which provides voice communication and/or data transmission capability are well known in the art, and include such personal communication systems as the newer cordless radiotelephone systems such as the CT-2 (second generation cordless telephone) and DECT (digital European cordless telephone) systems. In such cordless radiotelephone systems, voice communication is originated by one of the portable radiotelephone handsets, such as handset 20, which is in range of a transceiver station, such as a CT-2 telepoint base station 12.

For purposes of illustration, the description to follow will focus on a personal communication system, such as the CT-2 cordless radiotelephone system, although it will be appreciated that other forms of personal communication systems, such as other cordless telephone and cellular communication systems can also provide the voice communication capability between a portable radiotelephone handsets, such as handset 20, and a transceiver station, such as a cellular or telepoint base station 12.

In accordance with a further embodiment of the present invention, a wireless data communications system, such as a cellular paging system, could include wireless data units, such as paging receivers or transceivers, for receiving data transmissions from base stations coupled to a wireline data network.

Portable radiotelephone handsets suitable for use in a CT-2 systems are well known in the art, such as the SILVERLINK™ 2000 Personal Telephone manufactured by Motorola Inc. Telepoint base stations suitable for use in a CT-2 systems are also well known in the art, such as the SILVERLINK™ Telepoint Base Station manufactured by Motorola Inc. Such portable radiotelephone handsets and telepoint base stations provide voice communication utilizing the well known CT2/CAI communication protocol.

As calls are originated by the radiotelephone handsets, or portable radiotelephones, the calls are logged for billing purposes, among other things, by the telepoint base station, or transceiver station, through which the call is placed. Periodically, such as once a day, the call information collected at each of the telepoint base stations 12, 14, 16 and 18 is transferred to a central control point, such as the network control center 32. One such network control center is the Motorola Network Control Center (MNCC) and Business Management and Billing System (BMBS) for Public Telepoint Systems, which provides, among other things, automatic supervision of all system base stations and flexible billing cycles and automatic entry of recurring charges.

Unlike the prior art personal communication systems, the personal communication system in accordance with the preferred embodiment of the present invention provides a means for transmitting positional information, which includes the relative locations of the telepoint base stations, to the portable radiotelephones. This positional information is preferably fixed and changes only when telepoint base stations are added or deleted from the personal communication system. Therefore, the positional information will generally only need to be transmitted to or stored in the telepoint base stations once, unless telepoint base stations are added or deleted from the system.

Additionally, the personal communication system according to the present invention provides a means for collecting localized information pertaining to landmarks located within the vicinity of one or more of the telepoint base stations. When the landmarks are business establishments, such as shopping malls or airports, information pertaining to the conduct of business for the business establishments may also be collected. When the localized information includes more than a simple listing of landmarks, the localized information will generally be periodically transmitted to the telepoint base stations to provide updated information to the telepoint base stations.

The positional information and the localized information are preferably stored as a system information data base by the network control center 32 for transmission to the telepoint base stations, which are equipped to provide the positional and localized information, or a portion thereof, to requesting radiotelephone handsets, as will be described in detail below. The entry of the information to be included within the system information data base into the network control center 32 can be provided in any of a number of ways, such as through the use of conventional telephone handsets 38, through the use of computers or video displays terminals 40 which are coupled to the network control center 32 through the PSTN (public switched telephone network) using modems 42, or through an ISDN (integrated services data network) network 44, just to name a few. The nature and type of information provided for the system information data base will become more apparent in the description to follow.

Once the localized information to be included within the system information data base has been collected within the network control center 32, the localized information is distributed to the appropriate telepoint base stations 12, 14, 16 or 18, using preferably an RF transmission system, such as provided by paging transmitter 46 and a receiver located at the appropriate telepoint base stations. Other distribution methods, such as through the PSTN 30 or other wireline networks, could be utilized as well. Thereafter, when requested by a portable radiotelephone, positional and localized information, or a portion thereof, is transmitted from a telepoint base station with which the portable radiotelephone has established communication to the portable radiotelephone for storage and subsequent presentation thereby. Distribution of information included in the system information data base to the telepoint base stations and the portable radiotelephones will be described in greater detail below.

Figure 2:
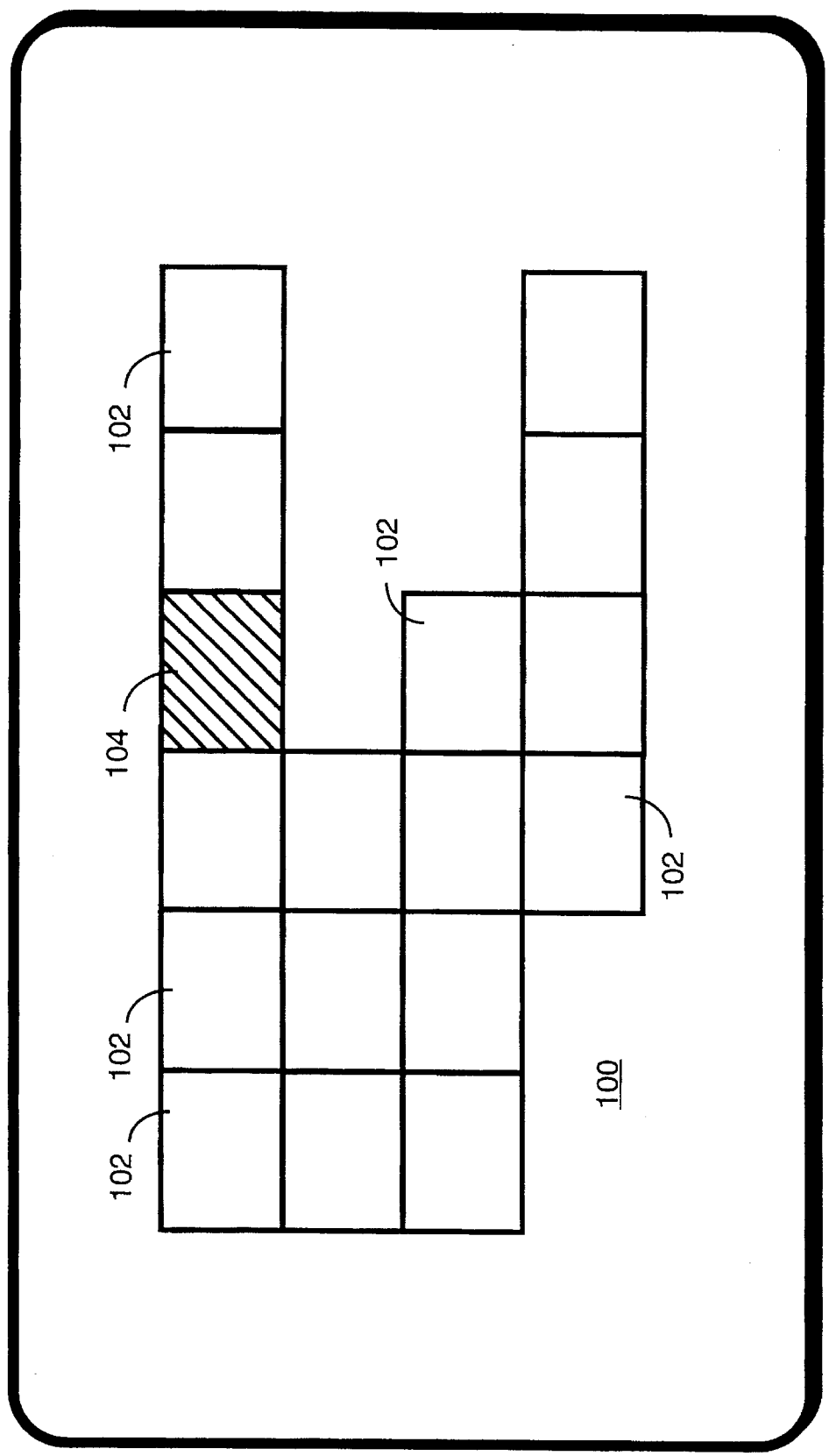
FIG. 2 is a pictorial diagram of an application of the positional information in accordance with the preferred embodiment of the present invention.

Reference is now directed to FIG. 2, which is a pictorial diagram depicting an application of the system information database. As mentioned above, the system information data base includes positional information pertaining to the telepoint base stations. This positional information is preferably displayed by the portable radiotelephone in the form of a coverage map 100 of at least a portion of the personal communication system, in which each telepoint base station is represented by icons 102. However, in a public telepoint system, such as the personal communication system described as the preferred embodiment, there may be hundreds, or even thousands, of telepoint base stations included within the personal communication system. It is not always feasible, therefore, to display a coverage map of the entire personal communication system. Rather, the telepoint base stations within a limited geographic area, such as a small suburb, may be represented by the icons on the coverage map. When the portable radiotelephone user relocates to a different geographic area, different positional information, stored by a different cluster of telepoint base stations, can be transmitted to the portable radiotelephone for generation of a different coverage map.

In a cellular data communication system, such as a cellular telephone system, on the other hand, each icon 102 represents a cell, or a portion thereof, included within the system. Because the cells are generally much larger than the coverage areas of the telepoint base stations, a coverage map of a larger geographic area may then be generated by a wireless data unit, e.g., a cellular telephone, included within the system.

Preferably, the icon 102 associated with the telepoint base station with which the portable radiotelephone has established communication is indicated in such a manner as to be discernible by the user. This may be done, for example, by flashing the icon or perhaps by shading the icon 104, as shown. As the portable radiotelephone moves from the coverage area of a first telepoint base station to the coverage area of a second telepoint base station, the icon associated with the second telepoint base station, rather than the icon associated with the first telepoint base station, will be shaded. In this manner, the user can conveniently determine an approximate direction of travel. Additionally, in a cellular data communication system, the user can determine whether or not he is in danger of traveling out of the system coverage range.

Figure 3:
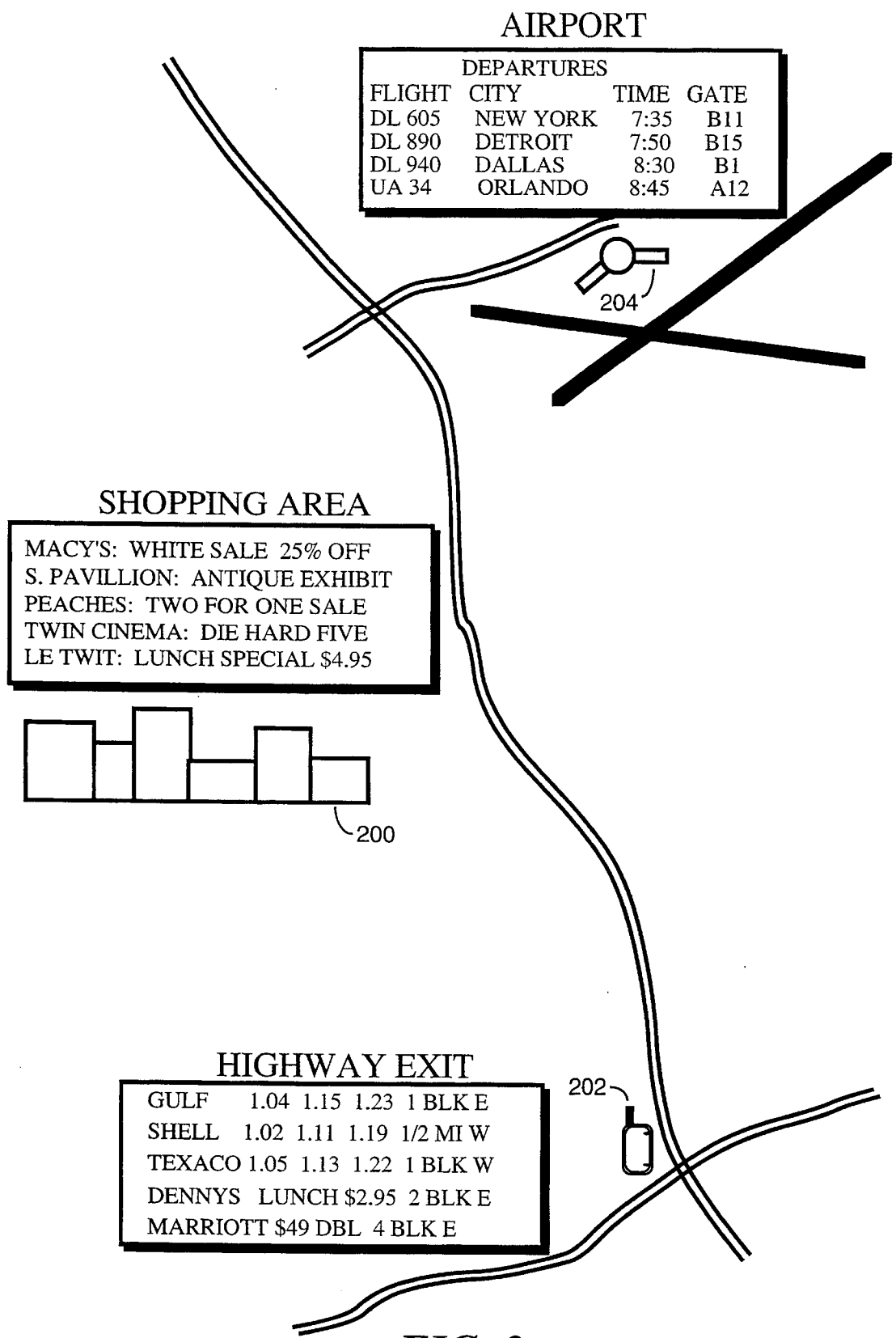
FIG. 3 is a pictorial diagram depicting the application of providing localized information in accordance with the preferred embodiment of the present invention.

Included within the portable radiotelephone according to the present invention is a keypad or a touch activated screen by which a user may select any of the displayed icons, in response to which localized information pertaining to the associated telepoint base station will be displayed, as may be better understood by referring to FIG. 3.

FIG. 3 illustrates the use of the localized information in accordance with the preferred embodiment of the present invention. As stated above, personal communication systems, such as a CT-2 cordless telephone system, provide wireless communication access to a wireline network, e.g., the PSTN in isolated islands of coverage, such as, but not limited to, shopping areas or malls 200 including restaurants and other places of business, spread throughout a geographic area or city, such as at Interstate Highway interchange 202, and in places providing public transportation, such as bus stations, railway stations and airports 204. Depending upon the location, access to the public switched telephone network may be through a single telepoint base station having but a single communication channel, such as at a highway interchange or other low traffic area, to multiple telepoint base stations employing multiple communication channels such as at an airport where the telepoint station would be distributed throughout the terminal and parking areas.

As shown in FIG. 3, the localized information includes information pertaining to the conduct of business for establishments located within the vicinity of a given telepoint base station. Examples of such localized information data base information includes service station related information such as gas prices and station location, restaurant location and motel information at typical highway interchanges, such as Interstate Highway interchange 202. Examples of such localized information include retail store sale information, movie guides and restaurant information, such as at shopping malls 200, or other shopping and entertainment districts. Still other examples of such localized information include airline departure or arrival information at airports 204. While the type of information described relates generally to the immediate vicinity of any particular telepoint base station, it will be appreciated other forms of information relating to the conduct of business, such as information on churches, police and fire, hospitals, and the like may include larger geographic areas beyond the immediate vicinity of any given telepoint base station.

In a cellular data communication system, as mentioned above, each icon 102 (FIG. 2) may represent a cell having a typically larger coverage area than a single telepoint base station. As a result, it may not always be practical to include detailed localized information that could consume extremely large blocks of memory. Alternatively, therefore, the localized information in a cellular data communication system could simply include a listing of landmarks, such as business establishments, located in each cell.

Figure 4:
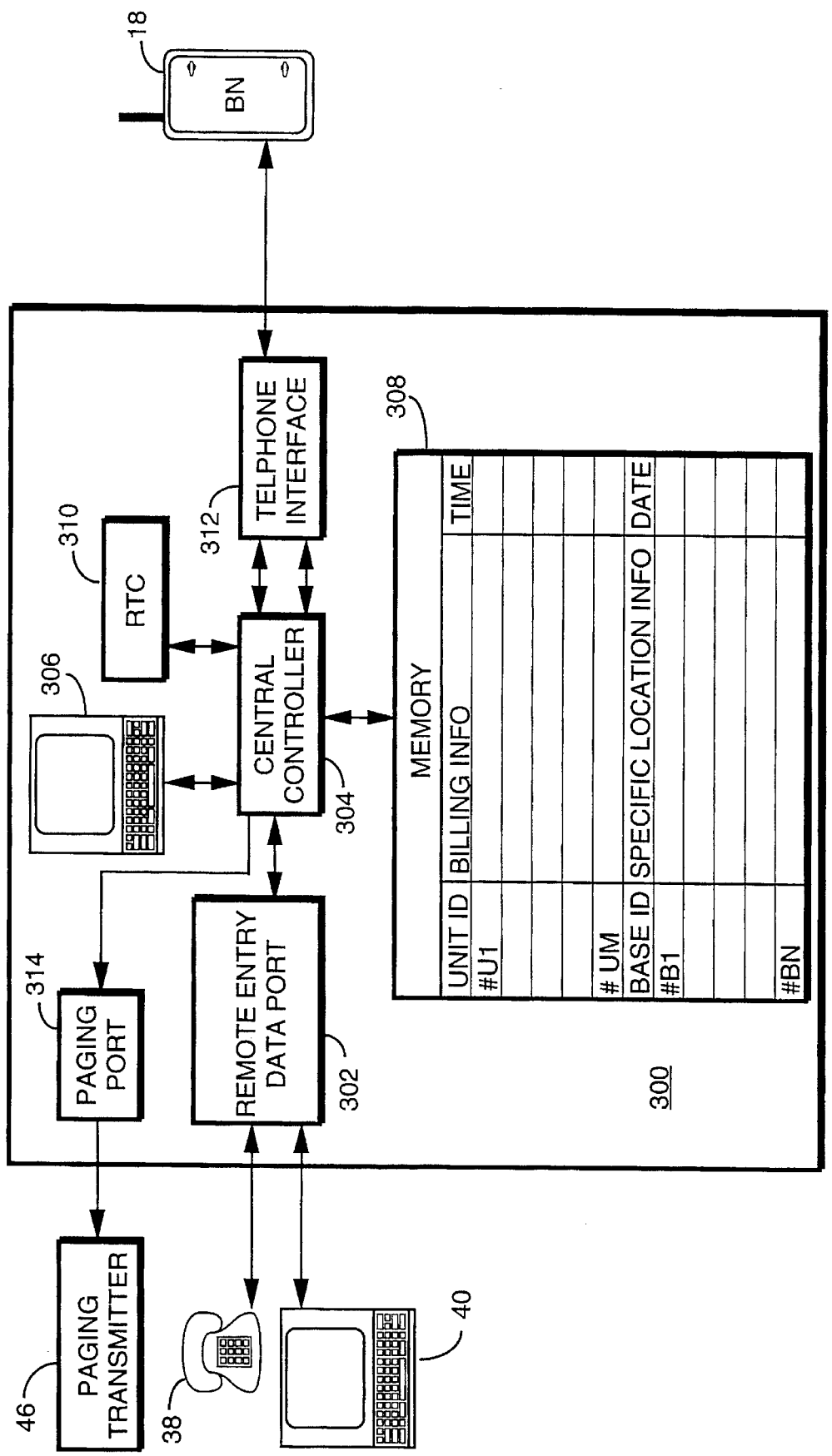
FIG. 4 is an electrical block diagram of the network control center in accordance with the preferred embodiment of the present invention.

FIG. 4 is an electrical block diagram of a network control center 300 in accordance with the preferred embodiment of the present invention. The network control center 300 includes a remote data entry port 302 which is utilized for the entry of information intended for the various localized information data bases throughout the personal communication network using such data entry devices as a telephone handset 38 or a computer or video display terminal 40. The remote entry data port 302 provides the required interface between the various remote entry devices and the network control center 300. The output of the remote entry data port 302 is coupled to a central controller 304, which is preferably microcomputer controlled using any of a number of well known microcomputer devices. Coupled to the central controller 304 are data entry devices, one of which is shown, such as a video display terminal 306. The data entry device 306 enables control of the personal communication system from the network control center 300, and entry of new subscriber numbers, or cancellation of old subscriber numbers from the personal communication system. A memory 308, which may be random access memory (RAM), floppy or hard disk drive memory, or magnetic tape, or any combination thereof, provides a subscriber data base listing all active and inactive portable radiotelephones, call billing information collected periodically from the telepoint base stations, and in the preferred embodiment of the present invention a general data base containing the system information data base, which includes the positional information and the localized information for each of the telepoint base stations throughout the personal communication system, as well as any associated billing information which may be derived therefrom. As shown, the localized information includes, but is not limited to, such data entries as the telepoint base station number, the specific location information, or localized information associated with the particular telepoint base station, and where appropriate, time or date information which may indicate such information as the date the information was posted on the system, and the length of time, or end date after which the information is to be removed from the system. It will be appreciated, the entry of the localized information may be either automatically or manually, as will be described in further detail below. When the localized information is time stamped, or dated, a real time clock 310 is used in conjunction with the central controller 304 to control the automatic deletion of the localized information, as well as to control such other system operations as call billing collection. The central controller 304 couples to a telephone interface 312 which couples the network control center 300 through the public switched telephone network 30 to the individual telepoint base stations, such as base station 18, located throughout the personal communication system. The central controller 304 also couples to the input of paging port 314. The output of paging port 314 is coupled to paging transmitter 46 which is used to distribute the localized information, as described below.

Figure 5:
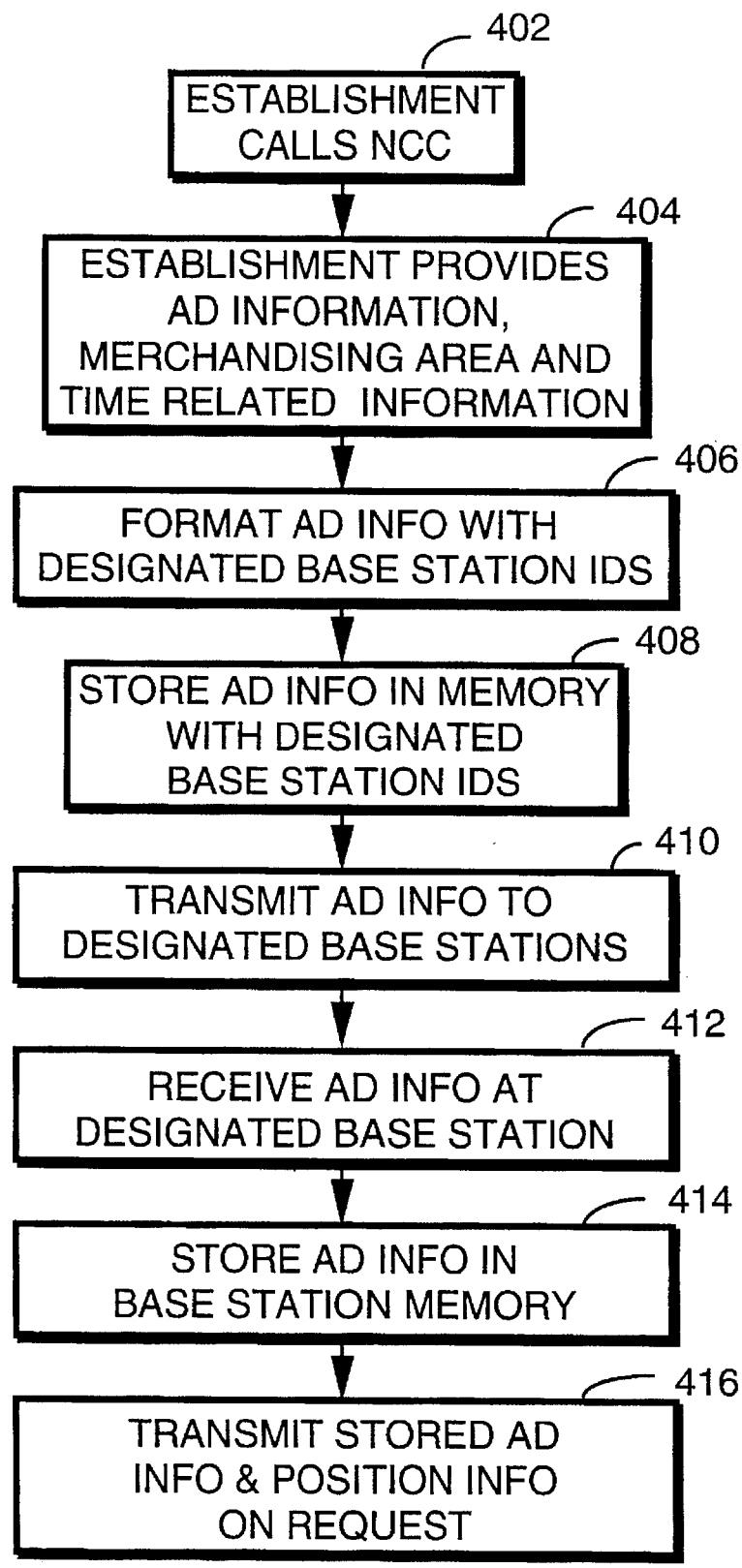
FIG. 5 is a flow chart depicting the formatting of the localized information in accordance with the preferred embodiment of the present invention.

FIG. 5 is a flow chart depicting the entry and formatting of the localized information in accordance with the preferred embodiment of the present invention. The establishment wishing to place information into the system information data base places a call the network communication center (NCC), at block 402 which functions as a means for collecting the information pertaining to the conduct of business. The call may be originated as described above using a telephone handset or computer or video display terminal over the public switched telephone network, or over an integrated services data network (ISDN). The establishment provides the information which is to be presented, which may include the establishment's name and location, any advertisement information, the merchandising area or area for which data distribution is to be provided, and any time related information, such as the length of time the information is to be available, at block 404. The information is formatted by the central controller which functions as a means for formatting the localized information for storage in the network control center memory together with the designated telepoint base station information, at block 406, and stored in memory, at block 408. The localized information is then, at predetermined time intervals such as daily, transmitted using the paging transmitter or public switched telephone network to the designated base stations, at block 410. The designated base stations receive the localized information intended for that station, at block 412 using any of a number of well known data transmission and receiving device selection protocols, such as the POCSAG or Golay Sequential Code signalling protocols for RF paging transmissions, or the X.25 communication protocol for communication over the public switched telephone network. The telepoint base station, after receiving the localized information, stores the information in the base station memory as will be described in detail below, at block 414, and then transmits the requested localized information, as well as positional information, to portable radiotelephones communicating therewith, as will be described below, at block 416.

Figure 6:
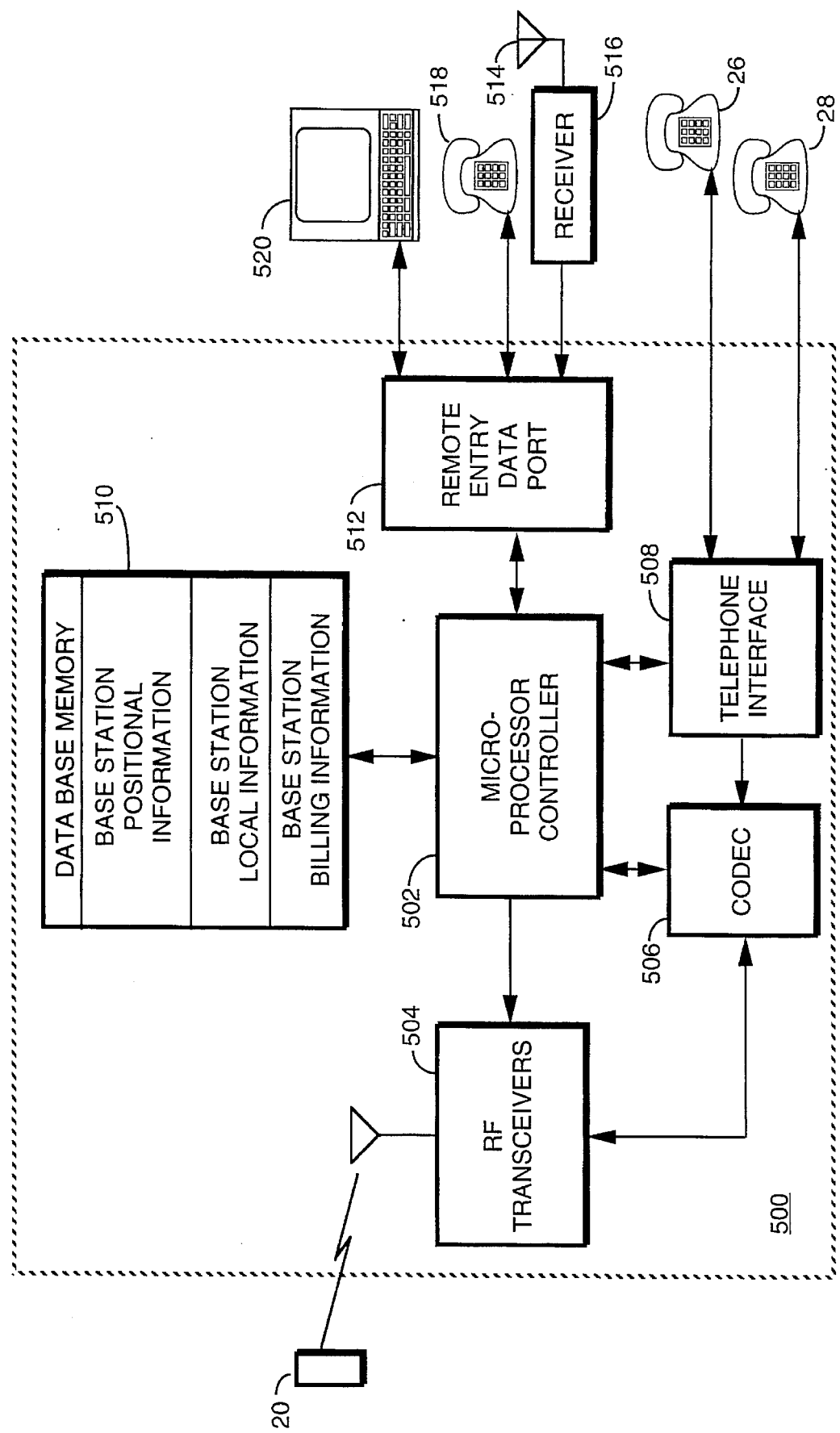
FIG. 6 is an electrical block diagram of the transceiver station in accordance with the preferred embodiment of the present invention.

FIG. 6 is an electrical block diagram of the telepoint base station, or transceiver station 500, in accordance with the preferred embodiment of the present invention. The telepoint base station 500, includes a microprocessor controller 502 which controls the overall operation the telepoint base station 500 regarding voice communication between the telepoint base station and the portable radiotelephones in a manner well known in the art. Calls originated by a portable radiotelephone handset, such as handset 20, are received by one of the RF transceivers 504, or the RF transceiver in single transceiver telepoint base stations. The calls are coupled through codec 506 which processes the information in a manner well known in the art to provide an analog voice output which is coupled to telephone interface 508 under the control of the microprocessor controller 502. The outbound call is coupled from the telephone interface 508 through the public switched telephone network to the telephone handset 26, 28 to which the call is directed. The inbound call responses are directed from the telephone handset 26, 28 through the public switched telephone network to the telephone interface 508, which couples the inbound call response to the codec 506 which then converts the analog voice information into digital information for transmission under the control of microprocessor controller 502. The digitized call response is coupled to the RF transceiver 504 for transmission to the portable radiotelephone handset 20 originating the call. A data base memory 510 which is coupled to the microprocessor controller, stores such information as an active/inactive subscriber data base as well as the information related to billing of call placed through the telepoint base station 500.

Unlike the prior art telepoint base stations, the telepoint base station in accordance with the preferred embodiment of the present invention includes a remote data entry port 512 which is coupled to the microprocessor controller 502. The localized information and the positional information which is transmitted from the network control center is received at the telepoint base station 500 through antenna 514 which is coupled to receiver 516. Receiver 516 processes the received information in a manner well known in the art to provide at the output a stream of digital information corresponding to the positional information, when received, and the localized information, which includes also address information specifying the telepoint base station to which the localized information is directed. The received address information is processed in a manner well known in the art by the microprocessor controller 502 which functions as an address decoding means. When the received address corresponds to the address assigned to the telepoint base station, the corresponding localized information and positional information is stored in the data base memory 510 under the control of the microprocessor controller 502.

In addition to the transmission of information from the network control center, localized information can also be directly entered into the telepoint base station 500 through the remote entry data port 512. When localized information is directly entered, such as through the use of a TOUCH-TONE™ telephone handset 518 or a computer or video display terminal 520, the microprocessor controller 502 controls the reception and storage of the information into the data base memory 510. In this instance, the microprocessor controller 502 provides a means for directly collecting the information pertaining to the conduct of business for the establishments located within the vicinity of the telepoint base station, enabling the generation of the localized information at the telepoint base station 500. Such direct entry of localized information is especially useful in such geographic areas as in airports, where the airlines directly control the ever changing arrival and departure information. Other geographic areas, such as in shopping malls could also route the localized information through a central collection point, such as the mall manager's office, who would then be responsible for posting the localized information to the telepoint base stations located throughout the mall.

Figure 7:
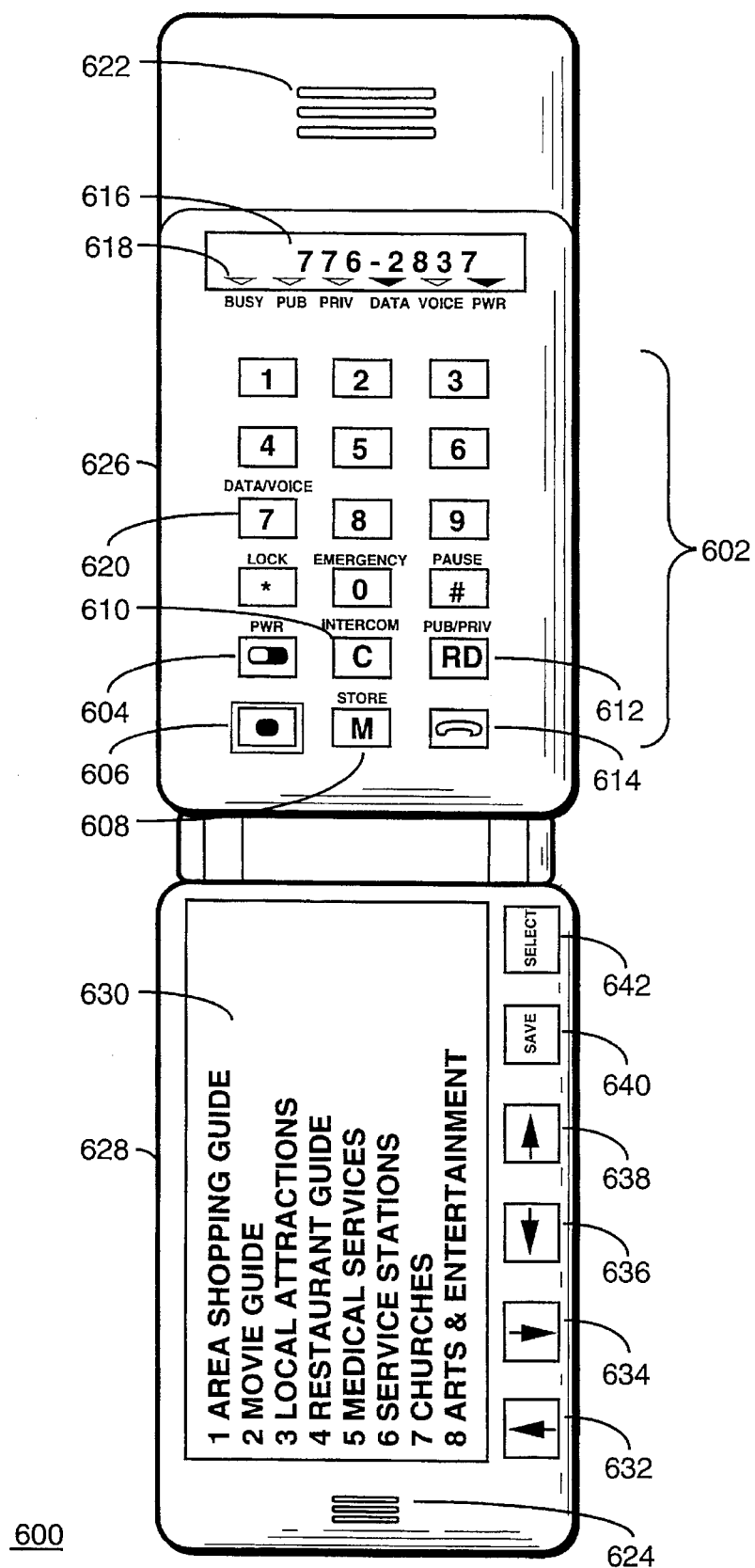
FIG. 7 is a pictorial diagram depicting the portable radiotelephone in accordance with the preferred embodiment of the present invention.

FIG. 7 is a pictorial diagram depicting a preferred embodiment of the portable radiotelephone 600 in accordance with the preferred embodiment of the present invention. The portable radiotelephone 600 includes an eighteen key keyboard 602 which includes ten digit keys and eight function keys. The function keys include the conventional asterisk (*) and pound (#) keys, a unit power selection key 604, a shift key 606, memory recall/store key 608, intercom/page key 610, redial/public-private selection key 612, and a call activation (phone) key 614. Secondary key functions are selectable using the shift key 606. A liquid crystal (LCD) display 616, which utilizes preferably twelve numeric digits, provides display of the selected telephone number. A row of display indicators 618 is also provided which indicate which of a number of preselected functions are active, such as BUSY, public (PUB), private (PRIV), DATA, VOICE and unit power on (PWR). Several function annunciators (not displayed) are also provided. In particular, the VOICE indicator indicates when the portable radiotelephone is in the voice mode for conventional telephone conversations, whereas the DATA indicator indicates when the portable radiotelephone has been placed in the data mode for reception of positional information and selected localized information. Selection of the voice and data modes is controlled by the shift key 606 and the DATA/VOICE mode selection switch 620. The dual keystroke selection prevents inadvertent mode alteration, thereby insuring voice or data mode calls are not inadvertently interrupted.

The portable radiotelephone 600 includes an earpiece 622 located in the keypad section 626 and a mouthpiece 624 located in the hinged keyboard cover section 628. Also within the hinged keyboard cover section 628 is a second liquid crystal (LCD) display 630 which provides for the display of icons and alphanumeric characters. The display 630 may be, for example, a dot matrix display capable of displaying pixel images. Preferably, the icons are utilized to display the coverage map 100 (FIG. 2) in which the positional information is included. The alphanumeric characters preferably are utilized for display of the localized information. It will be appreciated that other display formats and character sizes can be utilized as well, depending upon the amount of information which is to be displayed at any given time and the capabilities of the implemented user interface, for example, graphical user interface, pen input, etc.

Cursor keys 632, 634, 636, 638 enable the portable radiotelephone subscriber to select an icon when the positional information, i.e., the coverage map 100, is displayed, as described above. Upon selection of an icon, localized information pertaining to the associated telepoint base station is displayed, preferably as a directory or an image generated from graphic primitives as defined by the user interface. A typical "directory" level display is shown on LCD display 630, and includes such directory entries as "area shopping guide", "movie guide", "local attractions" guide, "restaurant guide", "medical services" directory, "service station" directory, "church" directory, and "arts and entertainment" guide. The "directory" level display is typical of a first portion of the localized information which would be transmitted upon request to the portable radiotelephone. Cursor keys 632, 634, 636 and 638 further enable the portable radiotelephone subscriber to select from particular categories which are representative of the telepoint base station geographic location, and which can vary from telepoint base station to telepoint base station in located different geographic areas. In particular, cursor keys 632 and 634 enable movement up and down within the directory or menu. Cursor keys 636 and 638 enable movement within a particular menu item, such as would be required when reading a lengthy message. As each menu, or level, of information is received from the telepoint base station, particular information can be saved within the portable radiotelephone using the "SAVE" key 640. The "SELECT" key initiates each data communications session with the telepoint base station when the DATA mode is selected, and further enables the recovery of selected localized information, when the portable radiotelephone is in the voice mode, thereby allowing retrieval and review of information which has been received and stored while the portable radiotelephone was in range of a telepoint base station, as will be described below.

In summary, the portable radiotelephone enables the subscriber to request positional and localized information from a telepoint base station with which communication is established. The information when received is displayed and can be stored for retrieval at a later time, thereby enabling the portable radiotelephone subscriber to obtain information when in range of a telepoint base station, and thereafter review the information on an as needed basis while the subscriber is in the geographic area covered by the received information.

Figure 8:
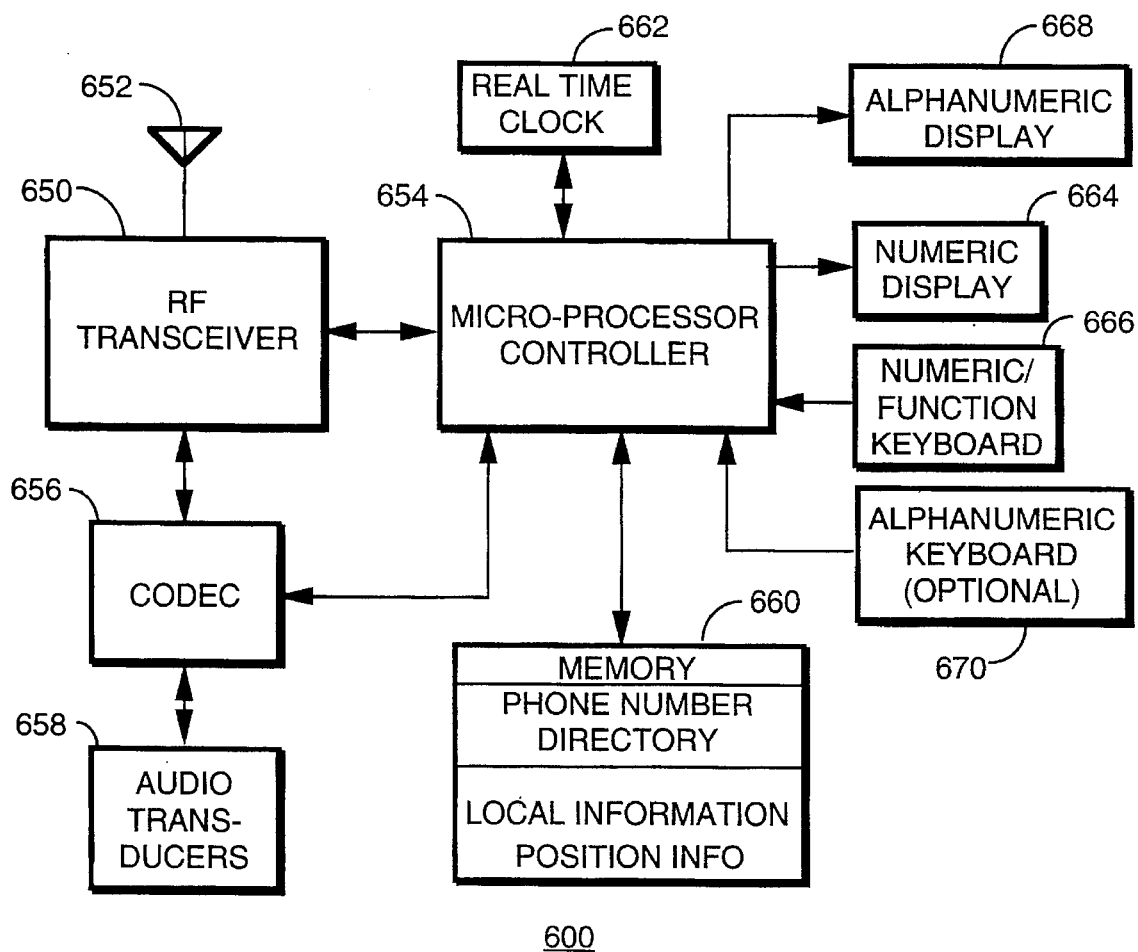
FIG. 8 is an electrical block diagram of the portable radiotelephone in accordance with the preferred embodiment of the present invention.

FIG. 8 is an electrical block diagram of the portable radiotelephone 600 in accordance with the preferred embodiment of the present invention. The portable radiotelephone 600 includes an RF transceiver 650 which is coupled to an antenna 652 for transmitting and receiving voice and data information. The RF transceiver is synthesized to enable the selection of one of the forty communication channels assigned to the CT-2 system. Selection of the channel of operation is controlled by the microprocessor controller 654, such as implemented using an MC 68HC05 microcomputer manufactured by Motorola, which also enables the codec 656 for encoding the analog voice information derived from audio mouthpiece transducer 658 into the digital format, and the decoding of the digitally encoded voice information into an analog format for delivery by the audio earpiece transducer 658. A memory 660, such as a random access memory (RAM) or electrically erasable programmable read only memory (EEPROM) stores such information as often used phone numbers in a phone number directory file, and the positional and localized information which was received and stored, as described above. A real time clock 662 is coupled to the microprocessor controller 654 and enables such functions as automatic deletion of localized information as described above. A numeric display 664, as described above, is coupled to the microprocessor controller 654, and provides for displaying telephone numbers, and other information relative to the operation of the portable radiotelephone. A numeric/function keypad 666, as described above, is coupled to the microprocessor controller 654, and enables entry of phone numbers, and control of the operation of the portable radiotelephone, including such functions as the selection of voice or data modes of operation. An alphanumeric or dot matrix display, as described above, is also coupled to the microprocessor controller 654, and provides display of the positional information and selected localized information. An alphanumeric keyboard 680 can also be provided which is coupled to the microprocessor controller which would allow the portable radiotelephone subscriber to enter specific alphanumeric information which could be utilized to select information to be transmitted from the telepoint base station, or which could be used in the retrieval of information stored in the device memory 660.

Figure 9:
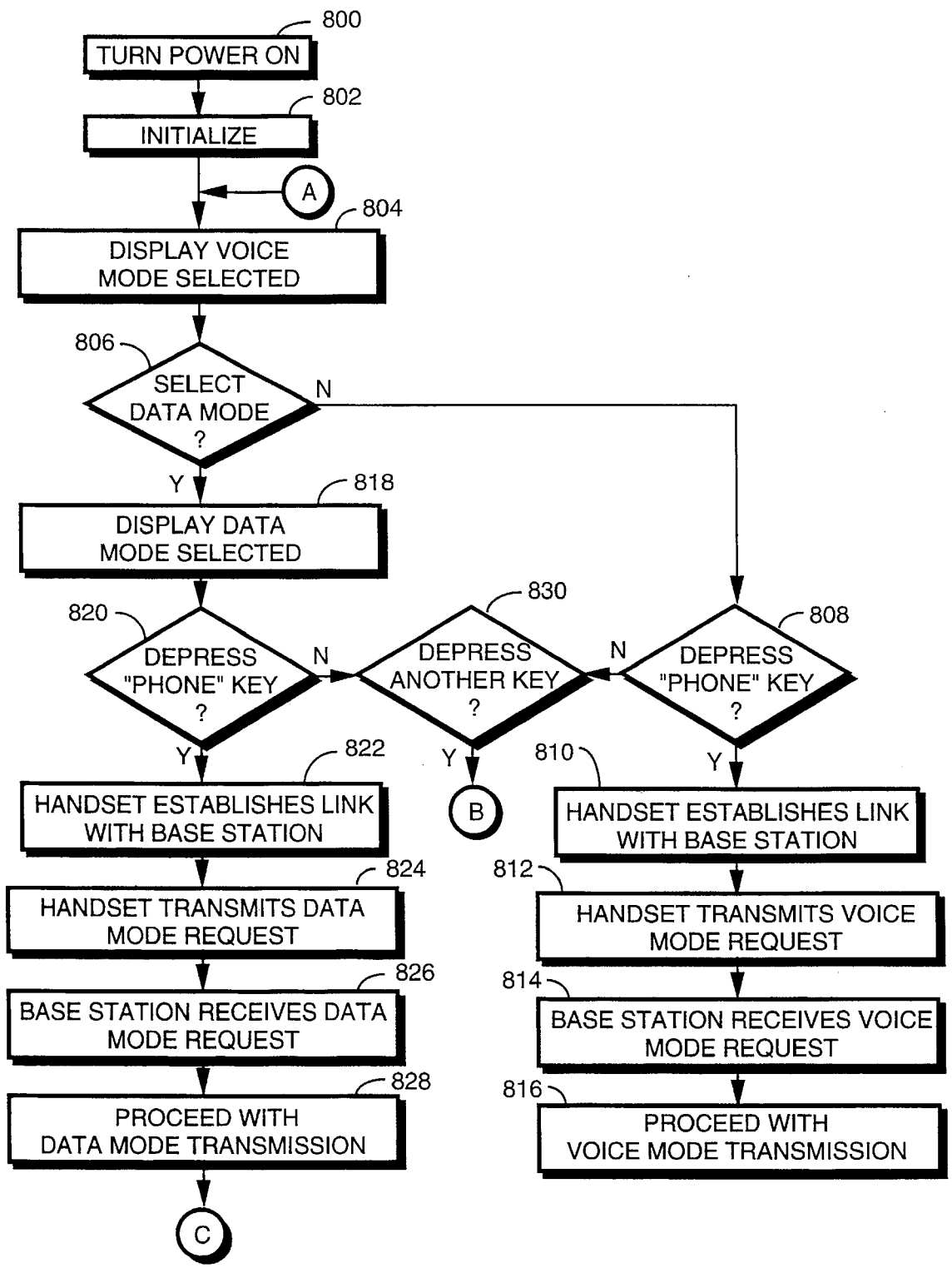
FIGS. 9-11 are flow charts depicting the operation of the portable radiotelephone and the transceiver station in accordance with the preferred embodiment of the present invention.
Figure 10:
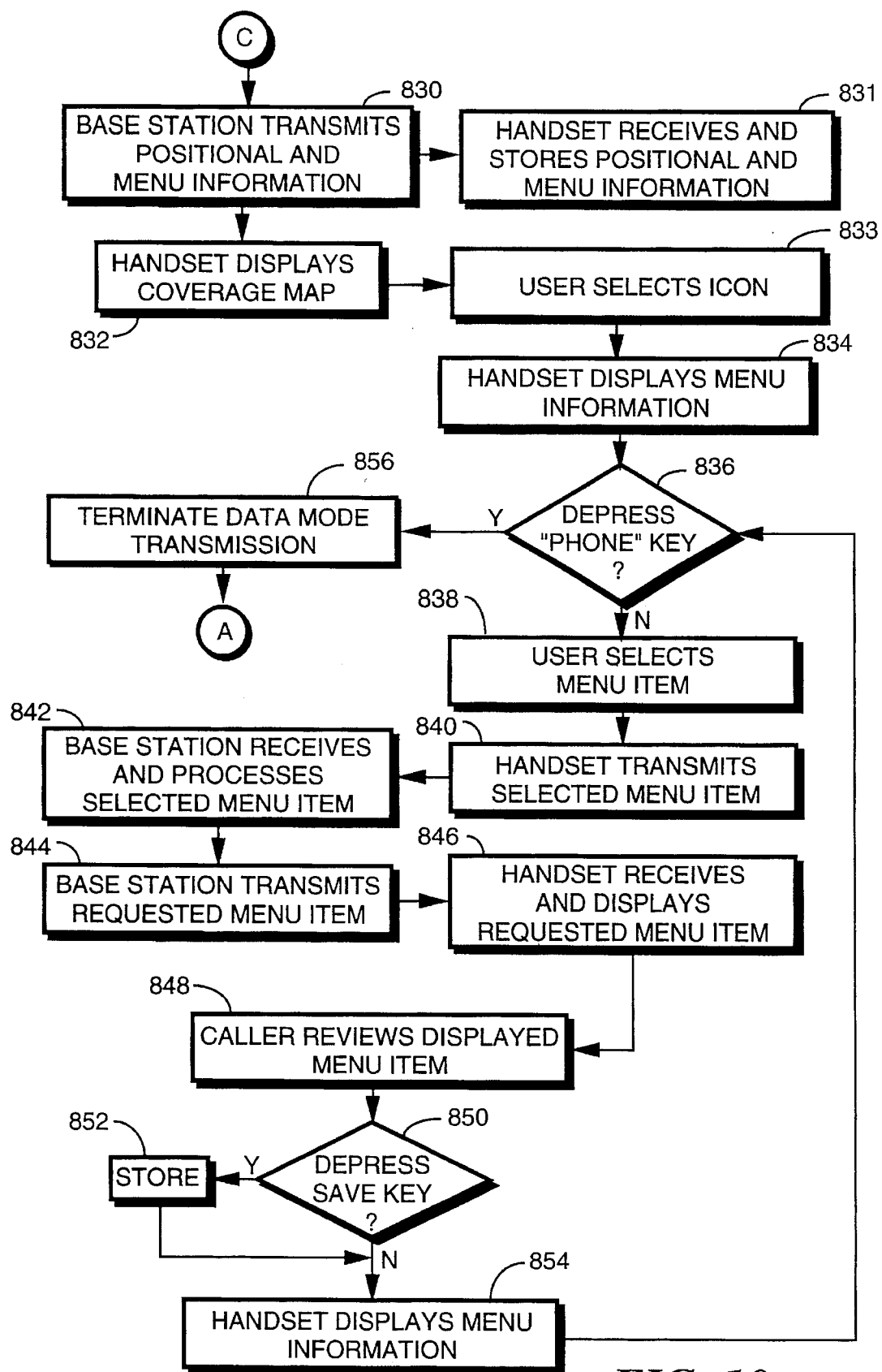
Figure 11:
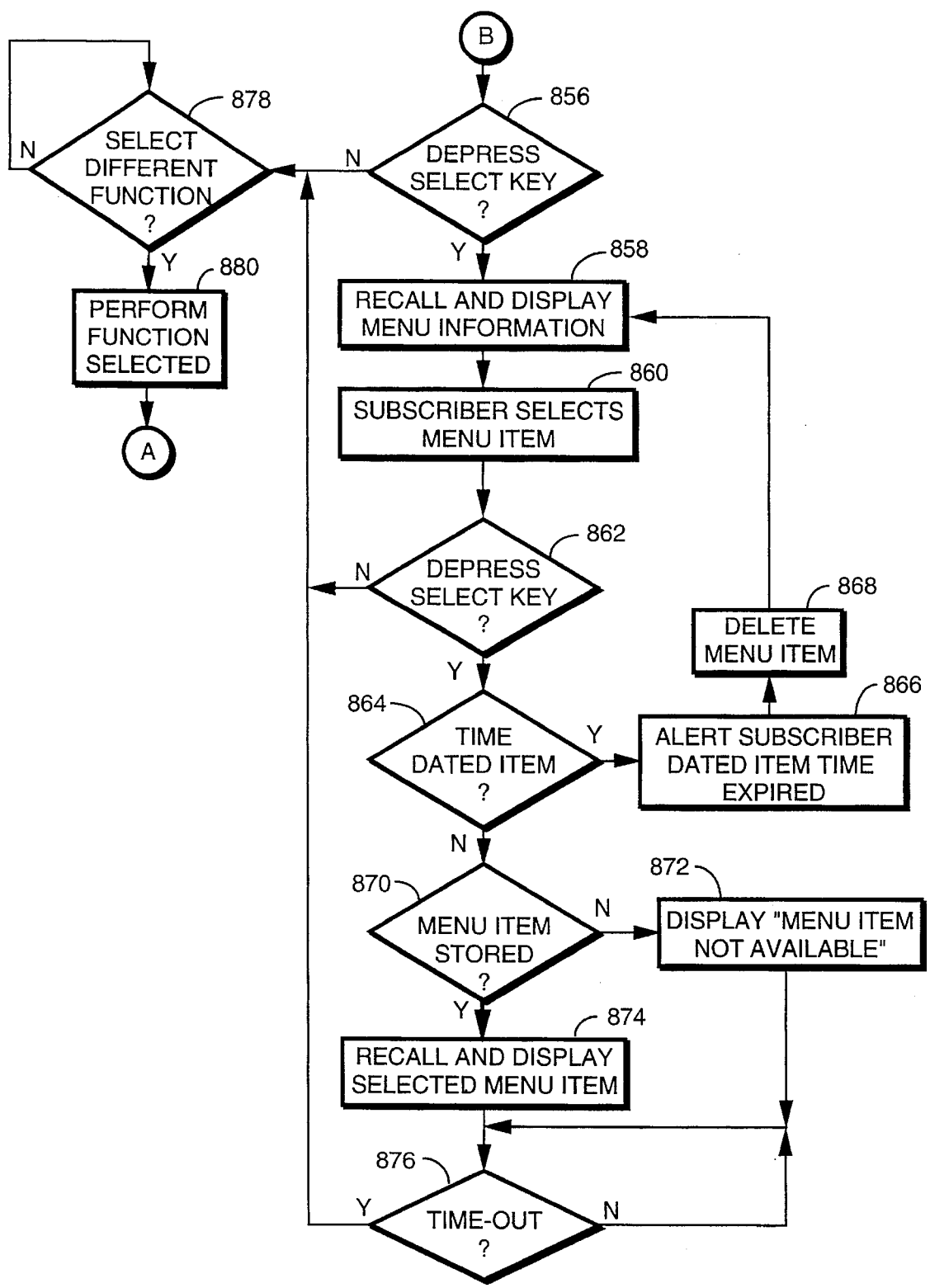

FIGS. 9–11 are flow charts depicting the operation of the portable radiotelephone and the transceiver station in accordance with the preferred embodiment of the present invention. In particular, referring to FIG. 9, when the portable radiotelephone subscriber turns the unit power on, at step 800, the microprocessor controller is initialized, at step 802. Initialization includes selection of the voice mode of transmission, in which instance, the numeric display indicator indicates the voice mode is selected, at step 804. When the data mode is not selected, at step 806, and the "phone" key is actuated, at step 808, the handset establishes a link with the telepoint base station using the well known CT2 MUX1 signaling protocol, at step 810. The handset next transmits the well known MUX2 signaling protocol, at step 812 indicating a voice mode request is being made, which is received and processed by the telepoint base station, at step 814. Upon completion of the voice mode log-on procedure, the portable radiotelephone and the telepoint base station switch to the well known MUX3 signalling protocol, at step 816, to enable voice communication in a manner well known in the art.

However, when the data mode is selected, by actuating the "shift" key followed by the "data/voice" key, at step 806, the numeric display indicators indicates the data mode is selected, at step 818. When the data mode is selected, and the "phone" key is actuated, at step 820, the handset establishes a link with the telepoint base station, at step 822, using the MUX1 signaling protocol as described above. The handset next transmits a modified MUX2 signaling protocol, at step 824, indicating a data mode request is being made, which is received and processed by the telepoint base station, at step 826. Upon completion of the data mode log-on procedure, the portable radiotelephone and the telepoint base station switch to a further modified MUX2 signaling protocol, at step 828, to enable data communication as described above, and will be further described below.

Referring to FIG. 10, when the data mode is selected and the portable radiotelephone has established communication with the telepoint base station, the telepoint base station transmits the positional information and the "directory" or "menu" information (at least a portion of the localized information) as described above, at step 830. The handset receives and stores the positional information and the "menu" information, at step 831, and displays the iconic "coverage map" screen, including the positional information, at step 832. Thereafter, the user selects, at step 833, one of the displayed icons using the cursor keys, as described above. The "menu" information for the telepoint base station associated with the selected icon is subsequently displayed, at step 834. It will be appreciated that where only a limited amount of information is required to be transmitted, the "menu" screen may include all the information associated with the particular telepoint base station. An example of a representative "menu" information screen is presented in Table I below.

Table I

1 AREA SHOPPING GUIDE
2 MOVIE GUIDE
3 LOCAL ATTRACTIONS
4 RESTAURANT GUIDE
5 MEDICAL SERVICES
6 SERVICE STATIONS
7 CHURCHES
8 ARTS AND ENTERTAINMENT

When the "phone" key is not actuated, at step 836, and the subscriber selects one of the "menu" items, at step 838, using the cursor keys, the handset transmits an indication of the "menu" item selected, at step 840. The telepoint base station receives and processes the selected "menu" item, at step 842, and proceeds to transmit the selected "menu" item to the portable radiotelephone, at step 844. The handset then receives and displays the selected "menu" item, at step 846.

TABLE II

| ORANGE BLOSSOM MALL HIGHLIGHTS | |
|---|---|
| SHEARS & SAWBUCK | > |
| LORD TAYLOR'S | > |
| MAZZIES | > |
| PENNIES | > |
| CAROL'S BOUTIQUE | > |
| JEANS N' THINGS | > |
| NEXT SCREEN | |

The subscriber can review the selected "menu" item, at step 848. As shown in TABLE II, a continuation character (>) can be provided which indicates additional information has been received which can be reviewed using the additional cursor keys, as described above. The subscriber can elect to save the received "menu" item, at step 850, by depressing the SAVE key. When the SAVE key is depressed, the selected menu item which is currently being displayed is stored in the memory, at step 852.

After the subscriber has elected to save the selected "menu" item, at step 850, or after a predetermined time-out, the handset reverts to the "menu" information display, at step 854. The subscriber can then depress the "phone" key, at step 836, thereby terminating the communication with the telepoint base station, at step 856, or can select another "menu" item, at step 838. When another "menu" item is selected, at step 838, steps 840 through 854 are repeated to receive the next selected "menu" item. In this manner, as many "menu" items can be selected and saved by the subscriber, as the subscriber desires to receive. When the data call is terminated, at step 856, the microprocessor controller returns to the voice mode of operation, as indicated in FIG. 9, and the numeric display indicator indicates the voice mode is selected, at step 804. Independent of the mode of operation selected, when any key is actuated, at step 830, other than the "phone" key at steps 808 or 820, the operation continues as shown in FIG. 11. When the key depressed is the SELECT key, at step 856, the "menu" information is retrieved and displayed, at step 858. The subscriber can then select a "menu" item, at step 860, using the cursor keys as described above. When the SELECT key is depressed, at step 862, the date field is evaluated, when present, at step 864. When the date field indicates the "menu" item information is out-of-date, i.e. the current real time clock date is later than the date stored in the date field, at step 864, the subscriber is alerted that the "menu" item information is out of date, at step 866, and the out-of-date "menu" item is deleted from memory, at step 868, after which the "menu" information is again retrieved and displayed, at step 858. It will be appreciated that in the alternate, the "menu" item information can be displayed for the subscriber to review prior to deleting the out-of-date "menu" item information.

When the date field is present and the date information is current, or the date field is absent, at step 864, the controller determines whether the "menu" item selected is stored, at step 870. When the "menu" item is stored, at step 870, the "menu" item is recalled from memory and displayed, at step 874. A display timer is set following the selection of the "menu" item at step 870. When the "menu" item is not stored in memory after being selected at step 870, a message, such as "menu item not available" is displayed. Following the time-out of the display timer at step 876, program control returns to either steps 856 or 878. When the SELECT key is again depressed at step 856, steps 858 through 876 are again repeated, as described above. When a function key other than the SELECT key is actuated, at step 878, the function associated with the selected function key is performed at step 880. Program control then returns to step 804, and continues as described above.

It may be appreciated by one skilled in the art that, when localized information is programmed directly into telepoint base stations by local business establishments, the telepoint base station with which the portable radiotelephone has established communication may not be able to provide more than rudimentary information about other telepoint base stations. For example, if the portable radiotelephone subscriber chooses, on the "coverage map" screen, to receive localized information about a different telepoint base station, the menu information provided to the portable radiotelephone might consist of nothing more than a list of landmarks or business establishments located in the vicinity of the different telepoint base station. However, when the portable radiotelephone subscriber chooses to receive localized information pertaining to the telepoint base station with which communication has been established, all localized information, such as information directly input by manufacturers, is once again available, as described in FIGS. 9–11.

In summary, a personal communication system for collecting and distributing information pertaining to the conduct of business for establishments located within the vicinity of transceivers station is described above. The portable communication system utilizes portable radiotelephones having a selectable data mode of operation. When the data mode of operation is selected, positional and localized information, preferably specific to one or more telepoint base stations included within a geographic area or a complete system, is selectively transmitted from the telepoint base station to which the portable radiotelephone has established communication. The received information can be stored within the portable radiotelephone for recall at a later time. The information can also be dated, or "time stamped", thereby enabling alerting the subscriber of recalled information which is out-of-date, or "stale". The particular type of information stored at any particular telepoint base station can be customized to include establishments only within the immediate vicinity of the telepoint base station, such as that of service stations, restaurants and motels, or can also include information of a less immediate, or more regional nature, such as that of lists of doctors, churches, public safety groups, etc. Additionally, the information may include establishments or other information about regions covered by other telepoint base stations. The localized information can include such information as the location of the establishments, or other information pertaining to the establishments, such as operating hours, sales information, or other information of interest to the portable radiotelephone subscriber.

We claim:

1. A personal communication system comprising:

stationary transceiver stations located within a predetermined geographic region for providing communication capability between one or more portable units and a wireline network within the predetermined geographic region and for transmitting a data base including at least positional information indicative of relative locations of the stationary transceiver stations within the predetermined geographic region; and a portable unit for receiving the data base including the positional information and for presenting an iconic representation indicative of the relative locations of the stationary transceiver stations within the predetermined geographic region, wherein the iconic representation further indicates to the user the stationary transceiver station with which the portable unit has established communication such that, as the portable unit is relocated between different areas within the predetermined geographic region and communication is established with different stationary transceiver stations, the iconic representation indicates to the user when the portable unit is approaching an area in which communication with the stationary transceiver stations included in the predetermined geographic region cannot be established.

2. The personal communication system according to claim 1, wherein the stationary transceiver stations are telepoint radiotelephone base stations.

3. The personal communication system according to claim 1, wherein the stationary transceiver stations are cellular base stations.

4. The personal communication system according to claim 1, wherein the data base further includes localized information pertaining to landmarks located within the vicinities of the stationary transceiver stations.

5. The personal communication system according to claim 4, wherein at least a portion of the landmarks are business establishments, and wherein the localized information includes information pertaining to the conduct of business for the establishments.

6. The personal communication system according to claim 1, wherein the stationary transceiver stations within the predetermined geographic region comprise all stationary transceiver stations within the personal communication system such that, as the portable unit is relocated to an area near an edge of the predetermined geographic region, the shading of an icon included in the iconic representation indicates to the user that the portable unit is approaching an area that is out of range of the personal communication system and in which communication cannot be established with any of the stationary transceiver stations.

7. The personal communication system according to claim 1, wherein the iconic representation includes one icon for each of the stationary transceiver stations, wherein the icon associated with the stationary transceiver station with which communication has been established is shaded such that a shaded icon near an edge of the iconic representation indicates to the user that the portable unit is approaching a geographic area in which communication cannot be established with the stationary transceiver stations within the predetermined geographic region.

8. The personal communication system according to claim 7, wherein lack of shading of any icon included within the iconic representation indicates that the portable unit is out of range of communication with the stationary transceiver stations located within the predetermined geographic region.

9. The personal communication system according to claim 1, wherein the stationary transceiver stations within the predetermined geographic region comprise only a subset of all stationary transceiver stations within the personal communication system.

10. A portable unit for use in a personal communication system which includes stationary transceiver stations located within a predetermined geographic region to provide communication between the portable unit and a wireline network within the predetermined geographic region, the stationary transceiver stations further being capable of storing and transmitting a data base including positional information pertaining to relative locations of the stationary transceiver stations within the predetermined geographic region, the portable unit comprising:

receiving means for receiving the data base transmitted by the stationary transceiver station and decoding therefrom the positional information; and presentation means for presenting an iconic representation indicative of the relative locations of the stationary transceiver stations and further indicative of the stationary transceiver station with which the portable unit has established communication such that the iconic representation indicates to the user when the portable unit is currently located in an area near an edge of the predetermined geographic region outside of which the portable unit cannot establish communication with the stationary transceiver stations within the predetermined geographic region.

11. The portable unit according to claim 10, wherein the data base further includes localized information pertaining to landmarks located within the vicinities of the stationary transceiver stations.

12. The portable unit according to claim 11, wherein at least a portion of the landmarks are business establishments, and wherein the localized information includes information pertaining to the conduct of business for the business establishments.

13. The portable unit according to claim 11, further comprising:

memory means coupled to the receiving means and the presentation means for storing the data base; and data entry means coupled to the memory means and the presentation means for receiving a user input selecting a displayed icon.

14. The portable unit of claim 10, wherein the iconic representation includes one icon for each of the stationary transceiver stations within the predetermined geographic region, and wherein the icon associated with the stationary transceiver station with which communication has been established is shaded such that a shaded icon near an edge of the iconic representation indicates to the user that the portable unit is approaching a geographic area in which communication cannot be established with the stationary transceiver stations within the predetermined geographic region.

15. The portable unit according to claim 14 wherein lack of shading of any icon included within the iconic representation indicates that the portable unit is out of range of communication with the stationary transceiver stations located within the predetermined geographic region.

16. The portable unit according to claim 10, wherein the stationary transceiver stations within the predetermined geographic region comprise all of the stationary transceiver stations within the personal communication system such that the iconic representation provides a coverage map of all areas in which communication is provided by the personal communication system.

\* \* \* \* \*